United States Patent [19]

Jansma et al.

[11] 4,084,034

[45] Apr. 11, 1978

[54] SODIUM CHLORIDE AND POLYDIALLYL DIMETHYL AMMONIUM CHLORIDE AS AN ELECTROCONDUCTIVE ADDITIVE

[75] Inventors: Roger H. Jansma, Park Forest; William E. Albrecht, Woodridge, both of Ill.

[73] Assignee: Nalco Chemical Company, Oak Brook, Ill.

[21] Appl. No.: 716,395

[22] Filed: Aug. 23, 1976

[51] Int. Cl.$^2$ .................. B32B 19/02; B32B 23/08; B32B 27/10

[52] U.S. Cl. .................. 428/342; 96/1.5 R; 106/14.5; 162/138; 252/8.8; 252/510; 252/518; 427/121; 427/391; 428/514; 526/4

[58] Field of Search .............. 428/330, 341, 342, 514, 428/537, 538, 539, 511; 427/121, 139; 252/8.8 R, 500, 510, 518; 106/14.5; 96/1.5; 526/4

[56] References Cited

U.S. PATENT DOCUMENTS

| | | | |
|---|---|---|---|
| Re. 28,543 | 9/1975 | Boothe et al. | 428/514 |
| 3,264,137 | 8/1966 | Gess | 428/514 |
| 3,348,970 | 10/1967 | Gess | 428/199 |
| 3,575,889 | 4/1971 | Klopffer | 252/8.8 R |
| 3,759,744 | 9/1973 | Schliesmar | 428/330 |
| 3,850,818 | 11/1974 | Katsumi et al. | 252/8.8 R |

*Primary Examiner*—George F. Lesmes
*Assistant Examiner*—R. Eugene Varndell, Jr.
*Attorney, Agent, or Firm*—John G. Premo; Robert A. Miller; Barry W. Sufrin

[57] ABSTRACT

Electroconductive paper useful typically in making copies by an electrostatic process may be made by incorporating therein NaCl and a polymer consisting of units derived from diallyl dimethyl ammonium chloride.

2 Claims, 5 Drawing Figures

FIG. 4 COATWEIGHT vs SER at 41½% R.H.
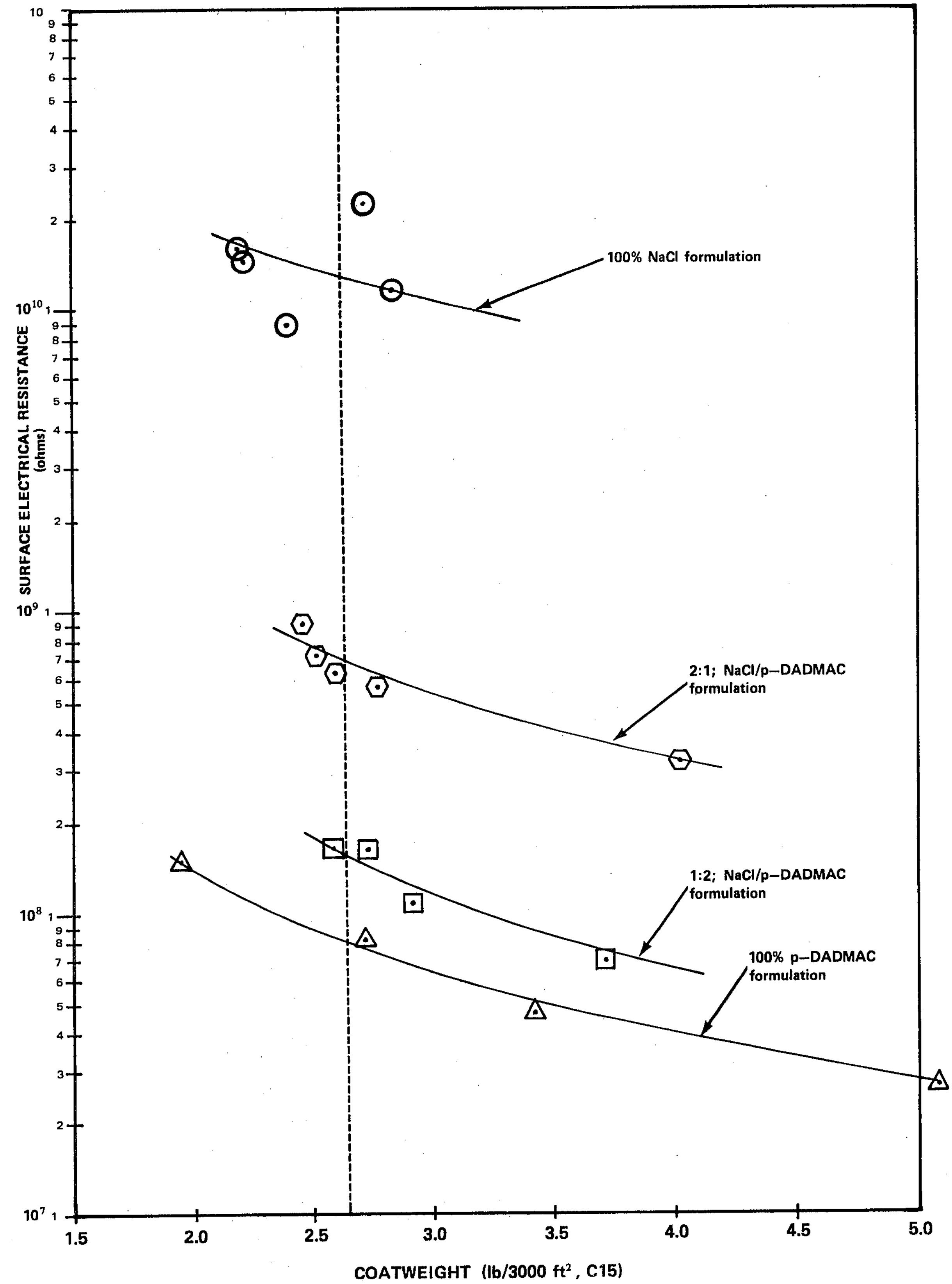

FIG. 5 COMPOSITION vs SER at 2.6 lb coatweight & 41½ R.H.
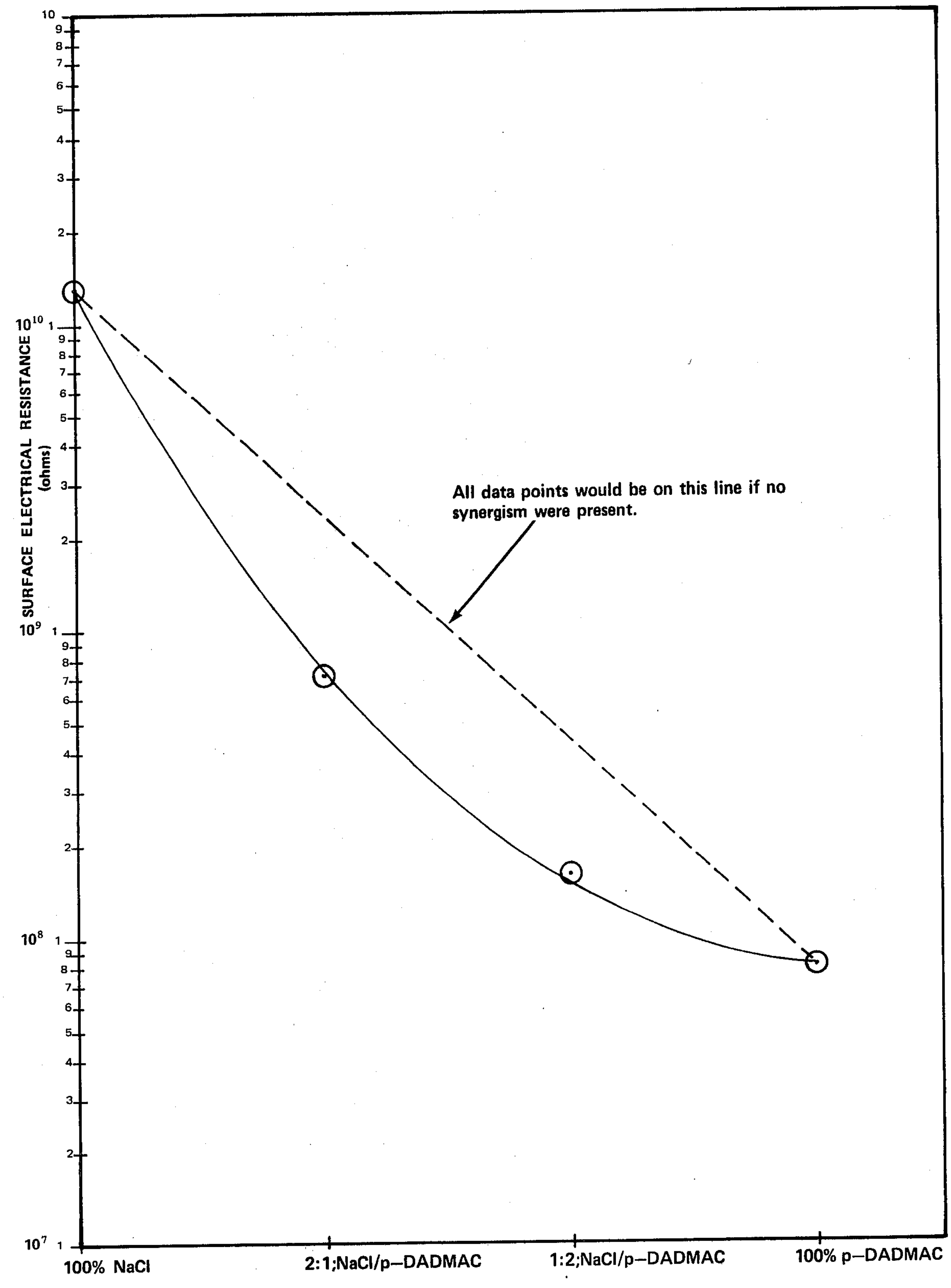

SODIUM CHLORIDE AND POLYDIALLYL DIMETHYL AMMONIUM CHLORIDE AS AN ELECTROCONDUCTIVE ADDITIVE

BACKGROUND OF THE INVENTION

This invention relates to paper containing electroconductive materials. In particular, it relates to paper rendered electroconductive by a layer or coating of electroconductive composition.

Electroconductive paper may be used to distribute electrical stresses in various insulating products; see U.S. Pat. No. 3,148,107. Where electrically conductive paper is to be used for nonimpact printing, a substrate, backing, impregnation coating or layer of electrically conductive material is usually constructed. See Vaurio and Fird, "Electrically Conductive Paper for Nonimpact Printing," Tappi, December, 1964, volume 47, No. 12, pages 163A–165A.

Various types of nonimpact printing processes are known as electrostatographic, electrophotographic, electrographic, "Electrofax" and other processes. As a rule, such processes call for the placement of an electric charge on the paper, which may be accomplished by a corona discharge, for example. The charge is, in most processes, placed on the paper in darkness. The paper may also contain a photo-responsive or photo-conductive layer or material, now popularly a specially treated zinc oxide which causes the charge to be dissipated in an area where light strikes it, thus leaving a pattern of the charged areas which is a reproduction of the image desired. The charged area attracts a powdered or other usually particulated image-forming material which may be fused or otherwise treated to make the image permanent. Other processes differ in that the image is created by electrical dissipation of the static charge in nonimage areas. In this and other processes (see Vaurio and Fird, supra), the common characteristic is an electrically conductive base paper.

Probably the most common system at present is the direct electrostatic process; see "Chemical & Engineering News," July 20, 1946, pages 88–89; U.S. Pat. No. 3,052,539. This process is similar to the xerographic method copy reproduction, except that the conductive substrate is built into paper rather than being on a separate drum or other device.

A well known electrically conductive material for use in nonimpact printing is described in U.S. Pat. No. Re-28,543. Among the electroconductive materials described therein is diallyl ammonium chloride.

SUMMARY OF THE INVENTION

Our invention is useful in imparting electroconductive characteristics to paper for use in the copying processes described above. Thus, we have discovered that a composition comprising NaCl and a homopolymer derived from free radical polymerization of diallyl dimethyl ammonium chloride may be used in making an electroconductive paper. (The homopolymer of diallyl dimethyl ammonium chloride may also be described as polydimethyl-3,5-methylene piperidinum salt).

The molecular weight of the homopolymer is not critical to conductivity. The molar ratio of diallyl dimethyl ammonium chloride polymer to NaCl may range from 1:3 to 3:1 although a 1:1 ratio is considered a convenient optimum. Paper coated with the electroconductive composition will contain from 0.1 to 3.0 pounds of the composition per 3,000 ft.$^2$ of paper.

BRIEF DESCRIPTION OF THE DRAWINGS

FIG. 4 is a graph plotting conductivity against coating weight at 41% RH; and FIG. 5 is a graph plotting conductivity against composition.

Figure 1:
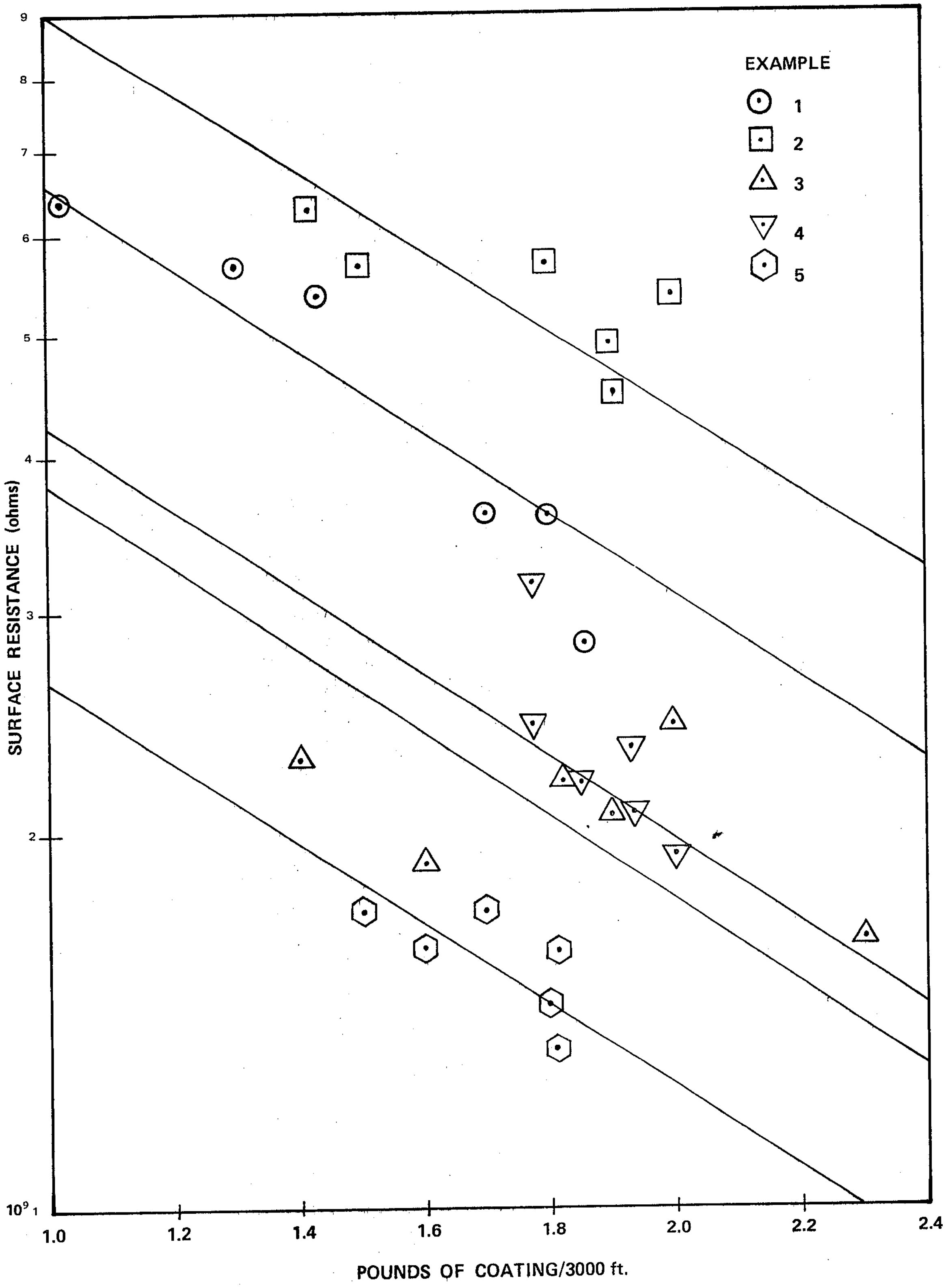
FIG. 1 is a graph plotting conductivity against coating weight at 58% RH.

As noted earlier, the use of diallyl ammonium chloride polymers as electrically conductive materials in electrographic copying is known. The present invention differs from the known art in that it teaches the use of sodium chloride in addition to the diallyl dimethyl ammonium chloride polymer. The utilization of the NaCl imparts conductivity considerably in excess of that which would be expected for either diallyl dimethyl ammonium chloride polymer or NaCl alone.

Further, NaCl is not generally employed in electrostatic copying. It would be expected that NaCl would poison the electroconductive material by migrating into the di-electric layer which is added in the final processing step. In addition, the sodium chloride would be expected to migrate into toner baths which are used to develop the electrostatic image: the presence of sodium chloride in the toner baths would hamper toner efficiency. Finally, it would be expected that sodium chloride alone would not produce sufficient conductivity for conventional electrophotographic copying processes.

Although the mechanism responsible for the observed synergistic activity of diallyl dimethyl ammonium chloride polymer and NaCl is unknown to the inventors, a theoretical mechanism may be suggested. According to this theory, it is believed that the hygroscopic diallyl dimethyl ammonium chloride polymer provides both ion sites and the water necessary for ion movement. The combination of ion sites and water are required to produce the necessary level of electroconductivity. In contrast to diallyl dimethyl ammonium chloride polymer, the NaCl provides ion sites, but it does not attract or hold sufficient water. Thus, the water brought in by the hygroscopic polymer enables the NaCl to function as an electroconductivity aid, thereby enhancing the overall conductivity of the diallyl dimethyl amonium chloride polymer - NaCl composition.

A noteworthy aspect of our invention becomes apparent when one looks at the following commercially utilized synthesis reaction for diallyl dimethyl ammonium chloride:

$$2\,CH_2{=}CHCH_2Cl + (CH_3)_2NH + NaOH \rightarrow (CH_2{=}CHCH_2)_2(CH_3)_2N^+\,Cl^- + NaCl + H_2O$$

Examination of this reaction shows that one mole of NaCl byproduct is produced for each mole of diallyl dimethyl ammonium chloride formed. Removal of this NaCl byproduct is a costly and time consuming process. Since the NaCl does not interfere with free radical polymerization of the diallyl dimethyl ammonium chloride polymer, the present invention makes it unnecessary to remove the NaCl: the electroconductive composition of our invention may thus be produced directly by synthesizing diallyl dimethyl ammonium chloride.

As is known in the art of electrostatic printing and other forms of nonimpact printing, conductivity measurements for conductive coatings on paper may be made on the conductive areas only; that is, the electrodes of the conductivity device may be simply attached to the conductive surface of the paper. Generally speaking, papers adapted for use in various types of nonimpact printing may have surface resistivities in the range of about $2.5 \times 10^5$ to about $3.0 \times 10^9$.

The following examples illustrate not only the utility of our invention in electroconductive paper, but also the conductivity of the paper at various relative humidities. The indicated changes in conductivity with relative humidity are good in comparison with the present state of the art. Example 3, in addition, shows the synergistic effect achieved through the use of NaCl in conjunction with diallyl dimethyl ammonium chloride polymer.

EXAMPLE 1

The purpose of this example is to evaluate an electroconductive composition containing diallyl dimethyl ammonium chloride and NaCl in equimolar proportions. The electroconductivity of paper coating formulations containing these electroconductive compositions were compared with diallyl dimethyl ammonium chloride polymer commercially available in an NaCl-free form. The basic coating formulations employed contained:

Electroconductive Composition: 1 part
Polyvinyl Acetate Latex (binder): 1 part
KCS Clay (solvent hold-out aid): 2 parts The coatings were prepared in a Waring blender: polymer and clay were blended for five minutes at low speed and then the latex was added and the coating mixed at low speed for an additional two minutes. The actual formulations used are described in Table I.

TABLE I

COATING FORMULATIONS

| EX. | ELECTROCONDUCTIVE COMPOSITION | % SOLIDS | BROOKFIELD VISCOSITY (80° F; #60 at 100 RPM) |
|---|---|---|---|
| 1 | DADMAC* Polymer | 42.4 | 1050 |
| 2 | " | 43.9 | 1080 |
| 3 | DADMAC Polymer + NaCl (equimolar amounts) | 47.4 | 1080 |
| 4 | " | 42.7 | 1100 |
| 5 | " | 45.5 | 1100 |

*Diallyl dimethyl ammonium chloride

The materials were diluted to approximately equal viscosity and then coated with a hand-held blade on Fletcher base stock. After coating, the sheets were dried with a hot air gun.

Conductivities were run on the samples at humidity levels of: 13%, 28% and 58% relative humidity (RH). A minimum of 2 hours were allowed for conditioning at each level.

Figure 2:
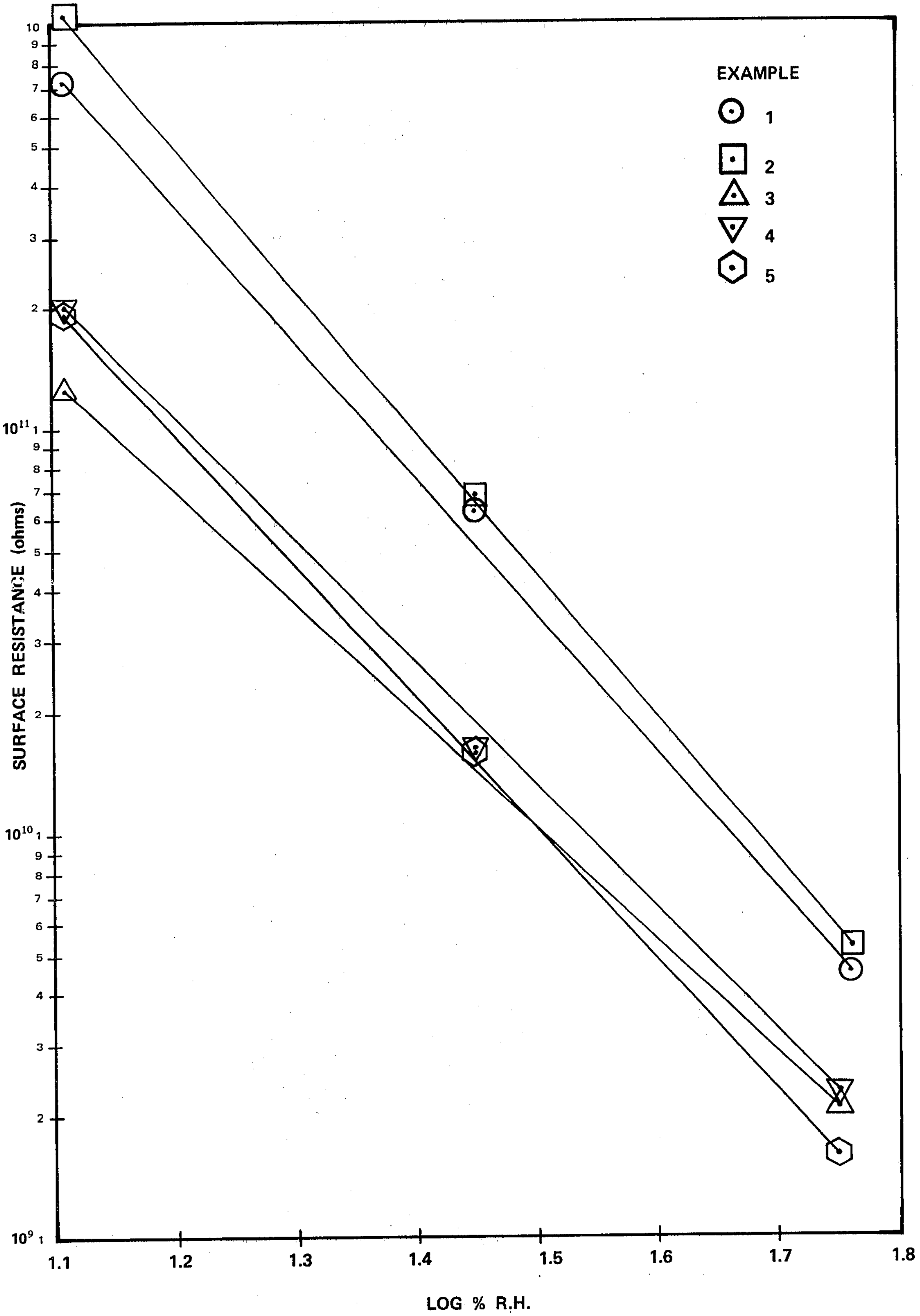
FIG. 2 is a graph plotting surface resistance against log percent relative humidity.

Results of the testing appear in FIGS. 1 and 2. FIG. 1 is a plot of conductivity against coat weight at 58% RH. Figures of the conductivities run at 28% and 13% RH showed trends similar to that of FIG. 1. FIG. 2 was obtained by plotting the result of averaging conductivity and coat weights against log percent RH. This figure gives a more accurate fix on the relative positions of the conductivity values. Both FIGS. 1 and 2 show significantly reduced surface resistance for the diallyl dimethyl ammonium chloride polymer-NaCl composition.

EXAMPLE 2

Another set of tests were run to compare the diallyl dimethyl ammonium chloride polymer-NaCl composition to diallyl dimethyl ammonium chloride polymer alone. The coating formulation contained electroconductive polymer, latex and clay in the proportions described in Example 1. The procedures of Example 1 were generally followed. Coatings were made to an approximate equal viscosity of 4500 cps at 25° C.

Figure 3:
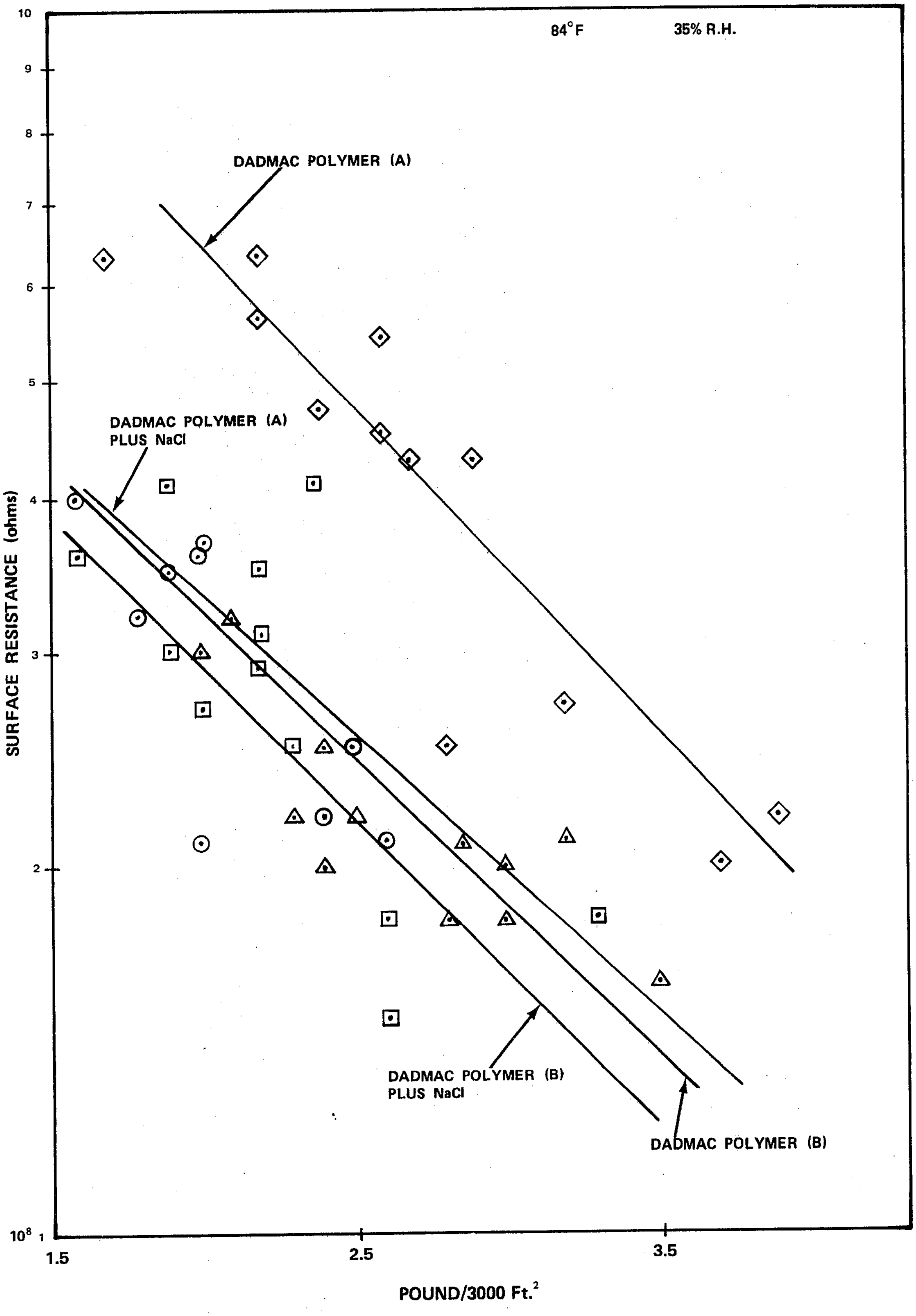
FIG. 3 is a graph plotting conductivity against coating weight at 35% RH.

The results of these tests appears in FIG. 3. Two different diallyl dimethyl ammonium chloride polymers (labeled "A" and "B") were compared with and without NaCl. In both cases, the NaCl-containing compositions showed reduced surface resistance. Once again, it is apparent that the diallyl dimethyl ammonium chloride polymer-salt composition produces conductivity superior to that of the diallyl dimethyl ammonium chloride polymer alone.

EXAMPLE 3

The purpose of the test described in this example was to determine whether a synergistic relationship exists between the NaCl and the diallyl dimethyl ammonium chloride polymer in the composition described in this patent application. Conductivities of sodium chloride, diallyl dimethyl ammonium chloride polymer and combinations thereof were compared as noted below. It was found that combinations of sodium chloride and diallyl dimethyl ammonium chloride polymer are more conductive than would be expected based upon the conductivity exhibited by either compound alone.

Two coatings were prepared to a 55% solids content. The electroconductive agent, the latex and the clay were used in the proportions described in Example 1. Formulations were prepared containing diallyl dimethyl ammonium chloride polymer alone and containing diallyl dimethyl ammonium chloride polymer and NaCl in ratios of 2:1 to 1:2. Fletcher base stock was used and the coating and drying techniques of Example 1 were followed. Additional drying for 2 minutes at 105° C was employed to assure equalibration from the dry state. The surface resistance measurements were made after overnight equalibration of the coated paper.

FIG. 4 is a plot of coatweight vs. surface resistance data. The surface resistances for the 2.6 pounds/3,000 $ft.^2$ coating were taken off FIG. 4 and plotted against composition to create FIG. 5. FIG. 5 shows that mixtures of sodium chloride and diallyl dimethyl ammonium chloride polymer produced a greater conductivity level than would be expected due to the additive effect on both conductive agents.

We claim:

1. Electroconductive paper including a layer of a coating composition containing sodium chloride and a water-soluble polymer consisting of units derived from diallyl dimethyl ammonium chloride, wherein the electroconductive paper contains about 0.1 to 3.0 pounds of the coating composition per 3,000 square feet of the paper and the molar ratio of the sodium chloride to the dialkyl dimethyl ammonium chloride ranges from 1:3 to 3:1.

2. The electroconductive paper of claim 1 wherein the coating composition contains equimolar amounts of the water-soluble polymer and the sodium chloride.

* * * * *